3,536,487
PHOTOGRAPHIC ELEMENTS AND PROCESSES FOR PRODUCING THEREIN INTERIMAGE EFFECTS WITH DIFFUSIBLE 4 - THIAZO-LINE-2-THIONE
James L. Graham, Rochester, N.Y., assignor to Eastman Kodak Company, Rochester, N.Y., a corporation of New Jersey
No Drawing. Continuation-in-part of applications Ser. No. 613,988, Feb. 6, 1967, and Ser. No. 694,398, Dec. 29, 1967. This application Mar. 28, 1969, Ser. No. 811,572
Int. Cl. G03c 5/50
U.S. Cl. 96—22
22 Claims

ABSTRACT OF THE DISCLOSURE

The present invention relates to unexposed photographic elements having a support carrying at least two superposed hydrophilic colloid layers containing silver halide, which layers form differently colored dye images in proportion to the silver images, at least one colloid layer of the element containing a diffusible 4-thiazoline-2-thione. The elements of this invention exhibit undercut interimage effects in at least one of the dye images. Processes of producing undercut interimage effects are also provided.

---

This application is a continuation-in-part of my copending application Ser. No. 613,988, filed Feb. 6, 1967, and a continuation-in-part of my copending application Ser. No. 694,398 filed Dec. 29, 1967, both applications being now abandoned.

The present invention relates to photographic elements, and more particularly to photographic elements for providing multicolor reproductions.

The dyes employed in providing multicolor photographic reproductions are not always "true colors." For example, magenta dyes often have small amounts of blue light absorption and red light absorption. Similarly, yellow dyes and cyan dyes absorb small amounts of light other than blue and red light, respectively. The effects of such unwanted absorptions by dyes employed in photographic multicolor processes is the production of dark and desaturated colors or color hue errors.

Such deficiencies in dyes employed in multicolor photographic processes can be compensated, at least in part, by creating certain interimage effects. The interimage effects to which this invention pertains are referred to herein as "undercut interimage effects." In accordance with this invention, novel means are provided for inducing undercut interimage effects in elements used in producing multicolor photographic reproductions.

It is one object of this invention to provide a novel method for correcting unwanted absorptions of dye images formed in photographic multicolor processes.

It is another object of this invention to provide a novel method for providing undercut interimage effects in photographic multicolor elements and processes which utilize at least one photographic silver haloiodide emulsion layer.

It is a further object of this invention to provide a novel method for introducing undercut interimage effects in photographic elements which produce multicolor images.

It is still another object of this invention to provide multilayer photographic elements which yield photographic dye images that exhibit undercut interimage effects.

Still other objects of this invention will be apparent from the disclosure herein and the appended claims.

In accordance with one embodiment of this invention, there is provided an unexposed photographic element suitable for producing multicolor records comprising a support having coated thereon at least two superposed hydrophilic colloid layers containing light-sensitive silver halide, at least one hydrophilic colloid layer of the element containing a diffusible 4-thiazoline-2-thione, which photographic element exhibits undercut interimage effects when photographic silver images are developed in said light sensitive layers and dye images are formed in proportion to said silver images. When a diffusible 4-thiazoline-2-thione is present during the formation of silver images in multicolor photographic elements of the types described above, undercut interimage effects are obtained in the completed multicolor photographic reproduction. Especially good undercut interimage effects are obtained when at least one silver halide emulsion layer contains silver haloiodide, such as silver bromoiodide or silver chlorobromoiodide. The invention also includes a process for forming dye images which exhibit undercut interimage effects.

In another embodiment of this invention, an unexposed photographic element suitable for producing multicolor records is provided which comprises a support having coated thereon at least three superposed hydrophilic colloid layers containing light sensitive silver halide, said layers being sensitive to red, green and blue radiation, at least one hydrophilic colloid layer of the element having incorporated therein 4-thiazoline-2-thione, which photographic element exhibits undercut interimage effects when photographic silver images are developed in said light sensitive layers and dye images are formed in proportion to said silver images.

In still another embodiment of this invention, there is provided an unexposed photographic element suitable for producing multicolor records which comprises a support having coated thereon at least three superposed hydrophilic colloid layers containing light sensitive silver bromoiodide, said layers being sensitive to red, green and blue radiation, each of said layers having incorporated therein a photographic color former which reacts with the oxidation products of primary aromatic amino color developing agent to form, respectively, cyan, magenta and yellow dye in said layers at least one of the hydrophilic colloid layers of said element having incorporated therein a 4-thiazoline-2-thione, which photographic element exhibits undercut interimage effects when photographic silver images are developed in said light sensitive layers and dye images are formed in proportion to said silver images.

Interimage effects are well known in photographic multicolor processes. See, for example, Hanson and Horton, Journal of the Optical Society of America, vol. 42, No. 9, pp. 663–669, September 1952, and Pinney, "Interimage Effects and Color Reproduction," The SPSE Reporter, November 1960. The interimage effects produced by the present invention are referred to herein and in the appended claims as "undercut" interimage effects. Undercut interimage effects are characterized by repression of a given color scale produced by a neutral exposure, and the lack of such repression for that color scale in a single color exposure.

A more specific, hypothetical example will further illustrate the meanig of undercut interimage effects. A photographic element is provided containing two light-sensitive silver halide emulsion layers. One of these layers is sensitive to red radiation and is adapted to form cyan dye. The second layer is sensitive to blue radiation, and forms yellow dye. One sample of such a film is given a stepped exposure to red light. A second sample is given a stepped exposure to red plus blue light. The amount of red light is the same in each exposure. Undercut interimage effects are present when the cyan dye produced from the exposure to red light only is less than the cyan dye produced from the exposure to red plus blue light. A similar analysis can be made for other dye images, such as red, green, blue, magenta and yellow.

Undercut interimage effects result in more saturated and brighter dye images. These interimage effects can be measured by the procedures described by Pinney or Hanson and Horton, referred to above.

As noted, the compounds employed in this invention to induce undercut interimage effects include the diffusible 4-thiazoline-2-thiones. These compounds generally are, at least in solution, in equilibrium with their corresponding mercaptan forms. The compounds should be capable of forming a complex with silver halide, thereby rendering the compound non-diffusible unless the silver halide is developed to a silver image. One especially useful class of 4-thiazoline-2-thione compounds has, in the 4-position thereof, an alkyl substituent having a carbonyl or hydroxyl group. As used herein and in the appended claims, the term carbonyl has its usual meaning, i.e., $=C=O$. Typical useful alkyl substituents containing a carbonyl group include formyl, carboxyl, alkoxycarbonyl, e.g., ethoxycarbonyl, and alkoxyalkyl, e.g., acetoxymethyl. Another highly useful class of 4-thiazoline-2-thiones contains an alkyl substituent in the 4-position thereof, said alkyl substituent consisting of from 4 to 5 carbon atoms, each of the carbon atoms having a hydroxyl group attached thereto. As used herein, the term 4-thiazoline-2-thione refers to the 3-hydrogen substituted 4-thiazoline-2-thiones (i.e. 3-hydrogen-4-thiazoline-2-thiones).

Also useful in this invention are disulfides which can be cleaved to form a 4-thiazoline-2-thione, such as bis-[5,4-(1,2-D-gluco)-thiazoyl]disulfide (referred to in the examples as Compound 13). As such, the disulfides do not appear to induce undercut interimage effects. When cleaved, they function just as the above-described 4-thiazoline-2-thiones.

Some typical 4-thiazoline-2-thiones useful in practicing the present invention are represented by the following general formula:

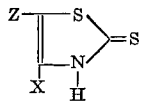

wherein X represents alkyl such as methyl or ethyl; an alkyl substituent containing at least one hydroxyl group such as hydroxy methyl, β-hydroxyethyl, gluco or arabino; or an alkyl substituent having at least one carbonyl-containing group such as formyl, carboxyl, ethoxy carbonyl or acetoxy methyl; and Z, is independently selected from a value given for X, and preferably represents hydrogen. Advantageously, the 4-thiazoline-2-thione compound employed is one which can enolize to its corresponding mercaptan form. Enolization can take place at any suitable time, such as when the 4-thiazoline-2-thione is added to a hydrophilic colloid layer containing light sensitive silver halide.

Representative diffusible 4-thiazoline-2-thiones which can be advantageously employed in the practice of this invention include the following:

(1) 4-thiazoline-4-carboxaldehyde-2-thione

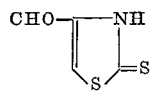

(2) 5-carbethoxy-4-methyl-4-thiazoline-2-thione

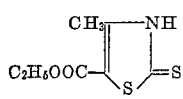

(3) 4-carboxy-4-thiazoline-2-thione

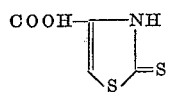

(4) 4-carboxy-5-methyl-4-thiazoline-2-thione

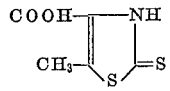

(5) 4-carbethoxy-4-thiazoline-2-thione

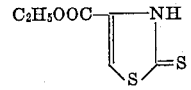

(6) 4-acetoxymethyl-4-thiazoline-2-thione

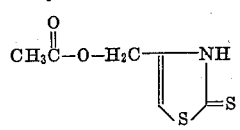

(7) 4-(D-arabino - tetraacetoxybutyl)-4-thiazoline-2-thione

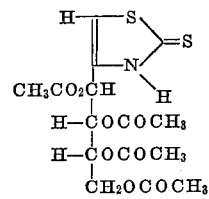

(8) 4-(D-gluco - penta-acetoxypentyl)-4-thiazoline-2-thione

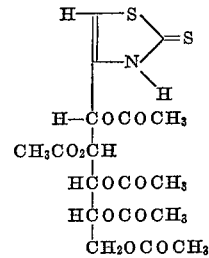

(9) 4 - (D-gluco-penta-hydroxypentyl)-4-thiazoline-2-thione

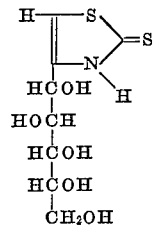

(10) 4-hydroxymethyl-4-thiazoline-2-thione

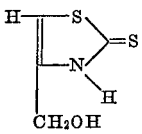

(11) 4-methyl-4-thiazoline-2-thione

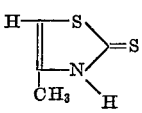

(12) 4 - (D-arabino - 1,2,3,4 - tetrahydroxybutyl)-4-thiazoline-2-thione

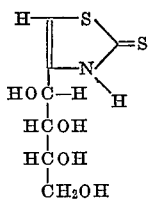

As is known, several isomers of Compound 12 exist. Any of these isomers, or mixtures thereof, can be employed in accordance with this invention to produce undercut interimage effects.

The 4-thiazoline-2-thiones employed in this invention are diffusible in hydrophilic colloids. As used herein, the term "diffusible" denotes materials having the property of moving effectively through the colloid layers of the photographic elements employed. Thus, it follows that any substituents on the subject compounds should not, alone or in their combined action, prevent diffusion of the compounds through the colloid layers employed in the photosensitive element. In short, the substituents of such compounds should be "non-ballasting." Although we do not wish to be limited to any theory as to the nature of the operation of our invention, it seems reasonable to believe that the 4-thiazoline-2-thiones become attached to silver halide crystals, and are prevented from diffusing freely through the colloid layers of the photographic element. However, when the silver halide is developed to silver image, it seems that the 4-thiazoline-2-thione is thus released and is diffused imagewise in the system, and probably inhibits development.

In order to obtain undercut interimage effects in accordance with the invention, the diffusible 4-thiazoline-2-thiones must be present in the photosensitive element during the development of silver image. The compounds can be advantageously added to one or more of the hydrophilic colloid layers, such as light sensitive silver halide emulsion layers, of the photosensitive element. The addenda can be added directly to a hydrophilic colloid melt before the layer is coated. The photosensitive element can also be treated subsequent to coating, but prior to exposure, with an aqueous solution containing the diffusible interimage producing addenda of the invention. When the addenda is added to the photosensitive element, one or more of the layers thereof can contain a 4-thiazoline-2-thione. The addenda can be added to all the colloid layers of the element, or added to one or all the light sensitive silver halide emulsion layers of the element. Addition of an effective amount of the addenda employed herein to one of the upper layers of the element, such as the gelatin overcoat or the uppermost light sensitive layer provides highly advantageous results.

The effective concentration of the addenda in accordance with this invention can be varied over a considerable range. The concentration employed depends on the particular light sensitive silver halide emulsions utilized, the concentration of silver halide in the emulsion layers, and the concentration of dye to be formed. General guidelines which may be followed with respect to concentration ranges are as follows: in silver halide emulsion layers, 5.0 mg. to 500 mg. of the addenda per mole of silver provides highly useful results, with a concentration of 100 mg. to 200 mg. addenda per mole of silver being the generally most useful range.

The 4-thiazoline - 2 - thione undercut interimage producers can be present in elements which are to be developed with any compound which functions to develop silver image in a silver halide layer containing a latent image. Highly useful classes of silver image developing agents include the polyhydroxy benzenes, N-monoalkylamino phenols and mixtures of polyhydroxy benzenes and N-monoalkylamino phenols. Typical useful polyhydroxy benzenes include hydroquinone, catechol, pyrogallol, etc., and typical useful N-substituted aminophenols include N-methylamino phenols, N-ethylamino phenols etc., or mixtures of such developers. Prominent among such developing agents are those which provide rapid development of photographic images comprising hydroquinone and p-N-methylamino phenol. The developing agents with which the undercut interimage increasing addenda of this invention can be used include dye developers, such as those disclosed and referred to in Weyerts et al., U.S. Pat. 3,146,102, issued Aug. 25, 1964, and Rogers, U.S. Pat. 2,983,606, issued May 9, 1961. The addenda of this invention can also be used in the photographic color processes described in Whitmore et al., U.S. Pat. 3,227,550, issued Sept. 7, 1962; Barr et al., U.S. Pat. 3,227,551, issued Jan. 4, 1966; Whitmore, U.S. Pat. 3,227,552, issued Jan. 4, 1966; Barr et al., U.S. Pat. 3,227,554, issued Jan. 4, 1966; or Barr, U.S. Pat. 3,243,294, issued Mar. 29, 1966.

Desirable undercut images are obtained in accordance with this invention when the processing is conducted at conventional temperatures, such as about 68 to 75° F., or when higher processing temperatures are employed, such as from 75° F. up to about 180° F., or higher.

The undercut interimage producing addenda of this invention can be used in any process of providing multicolor photographic reproductions which includes (1) developing silver images in an exposed photographic element having at least two superposed hydrophilic colloid layers containing silver halide, and (2) forming differently colored dye images in proportion to said silver images. For example, the addenda are highly useful in elements employed in complete photographic reversal processes wherein a multilayer photographic element containing a plurality of differentially sensitized photographic silver halide emulsion layers is given a first exposure, followed by development in a photographic developer for producing a black-and-white silver negative image, and a second exposure followed by at least one additional development in a photographic developer for producing a colored dye image. In such systems, the dye image may be provided in one of two classical techniques. In one, color couplers are incorporated in or contiguous to the photographic emulsions prior to exposure. Generally, the color forming couplers are dispersed in a suitable medium, such as one of those described in U.S. Pat. 2,322,027 or 2,304,940. Representative useful color formers which may be used in such processes are well known in the literature, and are described for example, in Fierke et al., U.S. Pat. 2,801,171; Weissberger et al., U.S. Pat. 2,474,293; Glass et al., U.S. Pat. 2,521,908; and McCrossen et al., U.S. Pat. 2,857,057. Such elements can be developed by one of the processes described and referred to in Graham et al. U.S. Pat. 3,046,129, col. 23 and 24. General classes of useful color formers include phenolic, 5-pyrazolone, and open chain ketomethylene compounds.

The second of such color reversal photographic processes is characterized by the introduction into the photosensitive element of dye former contained in the developer. In such processes, couplers of the type referred to above can be incorporated in a color developer solution. These processes are described in the literature, such as Mannes et al. U.S. Pat. 2,252,718, issued Aug. 19, 1941.

The color forming developers which can be used in accordance with the two processes described above have been previously described in the art. The most useful of such color forming developers are the phenylene diamines and substituted derivatives thereof, such as those disclosed in Weissberger et al., U.S. Pat. 2,548,574, issued Apr. 10, 1951; Weissberger et al., U.S. Pats. 2,552,240-2, issued May 8, 1951; and Weissberger et al., U.S. Pat. 2,566,271, issued Aug. 28, 1951. Other phenylene diamine color forming developers can be employed to advantage in the process of this invention.

This invention is also applicable to other photographic processes for forming multicolor images, such as color diffusion transfer processes of the type described in Rogers, U.S. Pat. 2,983,606, issued May 9, 1961; Weyerts, U.S. Pat. 3,146,102, issued Aug. 25, 1964; Barr et al., U.S. Pat. 3,227,551, issued Jan. 4, 1966; Barr et al., U.S. Pat 3,227,554, issued Jan. 4, 1966; Barr U.S. Pat. 3,243,294, issued Mar. 29, 1966; Whitmore et al., U.S. Pat. 3,227,550, issued Jan. 4, 1966; and Whitmore, U.S. Pat. 3,227,552, issued Aug. 27, 1964.

The novel addenda of this invention can also be employed to advantage in photographic elements which are useful in providing dye images by the photographic silver dye bleach process. In such processes, which are described in the literature, bleachable dye is incorporated in or contiguous to a given silver halide layer, a silver image is produced after exposure, and the dye is bleached imagewise in proportion to the silver image developed to provide contrasting dye images.

As is known, one highly useful arrangement of light sensitive silver halide layers for the provision of multicolor photographic records comprises a support having coated thereon, respectively, superposed light sensitive silver halide colloid layers which are sensitive, respectively, to red, green and blue radiation. Silver images can be developed in such layers, and dyes formed imagewise in proportion to the developed silver image. Advantageously, cyan, magenta and yellow dyes are formed in proportion to the red, green and blue layers respectively. Such dyes can be formed in any convenient manner, such as in the color processes referred to above. Advantageously, a dye image is formed having a complementary relationship to the region of the spectrum to which the silver halide emulsion is sensitized.

The addenda which has been described herein can be added to emulsions containing various light sensitive silver halide salts, such as silver bromide, silver iodide, silver chloride, or mixed silver halides, such as silver chlorobromide, silver bromoiodide or silver chlorobromoiodide. Best results are obtained when at least one emulsion layer contains silver haloiodide, such as silver chloroiodide, or preferably silver bromo iodide (or silver bromochloroiodide). Advantageously, the silver haloiodide contains from 1 to 10 mole percent, and preferably 4 to 8 mole percent, iodide. The emulsions can contain various chemical sensitizers, optical sensitizers, stabilizers, speed increasing compounds, plasticizers, hardeners and coating aids, such as are described and referred to in Beavers U.S. Pat. 3,039,873, issued June 19, 1962, cols. 9–12. The light sensitive silver halide salts can be dispersed in various binders, such as the colloids described and referred to in aforementioned Beavers patent, col. 13. Any suitable support can be used, such as a cellulose ester, poly(ethylene terephthalate), paper, baryta coated paper, polyolefin coated paper such as polyethylene or polypropylene coated paper, which can be electron bombarded to promote emulsion adhesion. Emulsion layers having different speeds can be utilized to extend the latitude of the element.

This invention will be further described and illustrated in the following examples.

In the examples, two types of photographic elements were employed. The first element, referred to herein as Type I, is prepared by coating a transparent poly(ethylene terephthalate) film support with the following hydrophilic colloid layers, in the order in which they are given starting from the support:

TYPE I

Layer A—antihalation

A dispersion of gray colloidal silver in gelatin is coated over the support at a concentration of 455 milligrams per square food gelatin and 23 milligrams per square foot gray colloidal silver.

Layer B—interlayer

A gelatin interlayer is coated over the antihalation layer at the rate of 115 milligrams gelatin per square foot.

Layer C—cyan-producing layer

A gelatin silver bromoiodide emulsion containing a dispersion of a mixture of cyan-forming coupler, e.g., couplers Nos. 1 through 6 of Fierke et al., U.S. Pat. 2,801,171 (col. 2) in conventional coupler solvent such as tri-o-cresyl phosphate is coated at the rate of 110 milligrams per square foot gelatin, 65 milligrams per square foot silver and 50 milligrams per square foot cyan coupler mixture. Red sensitization (600–700 m$\mu$) is provided with spectral sensitizing dye.

Layer D—interlayer

A gelatin layer coated at the rate of 60 milligrams gelatin per square foot.

Layer E—magneta-producing layer

A silver bromoiodide gelatin emulsion spectrally sensitized to green radiation (500–600 m$\mu$) with a spectral sensitizing dye and containing a dispersion in tri-o-cresyl phosphate of a pyrazolone coupler, e.g., couplers number 7 etc. of Fierke et al., U.S. Pat. 2,801,171 (col. 2) together with a pyrazolone coupler, e.g., coupler number 8 of U.S. Pat. 2,801,171 is coated at the rate of 165 milligrams per square foot gelatin, 95 milligrams per square foot silver and 65 milligrams per square foot coupler mixture.

Layer F—yellow filter layer

A gelatin layer containing Carey Lea colloidal silver is coated at the rate of 90 milligrams per square foot gelatin, and 10 milliagrams per square foot silver.

Layer G—yellow-producing layer

A gelatin silver bromoiodide emulsion (blue-sensitive) containing a yellow image-forming coupler, e.g., a coupler Nos. I to V of McCrossen et al., U.S. Pat. 2,875,057, issued Feb. 24, 1959, dispersed in dibutyl phthalate is coated at a concentration of 115 milligrams per square foot gelatin, 70 milligrams per square foot silver and 50 milligrams per square foot color coupler.

Layer H—overcoat layer

A gelatin layer is coated at the rate of 90 milligrams per square foot gelatin.

In the following examples, all elements of Type I are processed in the following reversal color process: first, the exposed film is developed for 10 minutes in a developer having the following composition:

| | |
|---|---|
| Sodium hexametaphosphate | g— 2.0 |
| N-methyl-p-aminophenol sulfate | g— 6.0 |
| Sodium sulfite, anhydrous | g— 50.0 |
| Hydroquinone | g— 6.0 |
| Sodium carbonate monohydrate | g— 35.0 |
| Potassium bromide | g— 2.0 |
| Sodium thiocyanate | g— 1.5 |
| 0.5% solution of 6-nitrobenzimidazole nitrate | cc— 12.0 |
| 0.1% solution of potassium iodide | cc— 10.0 |

Water to make 1 liter.

The element is then thoroughly washed for one minute with water and treated for 3 minutes in hardening bath having the following compositions:

| | |
|---|---|
| Potassium chrome alum crystals | g— 30.0 |

Water to make 1 liter.

The element is then thoroughly washed for 3 minutes with water and treated for 30 seconds in a solution having the following composition:

| | |
|---|---|
| Sodium borohydride | g— 0.25 |
| Sodium hydroxide | g— 4.0 |

Water to make 1 liter.

The element is then treated for 15 minutes in a color developer having the following composition:

| | |
|---|---|
| Benzyl alcohol | cc 6.0 |
| Sodium hexametaphosphate | g 2.0 |
| Sodium sulfite, anhydrous | g 5.0 |
| Trisodium phosphate | g 40.0 |
| Potassium bromide | g 0.25 |
| 0.1% solution of potassium iodide | cc 10.0 |
| Sodium hydroxide | g 6.5 |
| Color developer [1] | g 11.33 |
| Ethylenediamine sulfate | g 7.8 |
| Citrazinic acid | g 1.5 |
| Water to make 1 liter. | |

[1] 4 - amino - N - ethyl-N-($\beta$ - methanesulfonamidoethyl)-m-toluidine sesquisulfate monohydrate.

The element is then thoroughly washed for 5 minutes with water and treated in a clearing and fixing bath for five minutes having the following composition:

| | G. |
|---|---|
| Sodium thiosulfate | 150.0 |
| Sodium bisulfite | 20.0 |
| Water to make 1 liter. | |

The element was then treated for 8 minutes in a bleach bath having the following composition:

| | G. |
|---|---|
| Potassium dichromate | 5.0 |
| Potassium ferricyanide | 70.0 |
| Potassium bromide | 20.0 |
| Water to make 1 liter. | |

The element is again washed for one minute and treated for 4 minutes with the clearing and fixing bath identified above. The element is washed for 8 minutes and treated for one minute in a stabilizing bath having the following composition:

| | |
|---|---|
| Formaldehyde (37% by weight) | cc 7.0 |
| Dispersing agent [1] | g 0.5 |
| Water to make 1 liter. | |

[1] Such as Triton X-100, i.e., an alkylaryl polyether alcohol (octylphenoxy polyethoxy ethanol).

The above processing is referred to as Processing Procedure I in the examples. The temperature of each bath and solution in this processing is 75° F.

The second type of photographic element employed in the following examples, Type II, is the same as Type I except that Type II elements do not contain any incorporated color-former. These Type II elements are processed by a procedure of the type described in Mannes et al., U.S. Pat. 2,252,718, issued Aug. 19, 1941, p. 2, col. 2, line 48 through p. 3, col. 1, line 5. This processing is referred to in the examples as Processing Procedure II.

EXAMPLE 1

Two photographic elements of Type I are prepared. One of these elements serves as the control. The other element is a test element and is the same as the control except that 200 mg. of Compound 12 per mole of silver halide is incorporated in all three light sensitive silver halide emulsion layers, Layers C, E and G. Part of each element is given a uniform sensitometric red light exposure. Another part of each element is then given a neutral exposure (red plus green plus blue light). The red exposure is equivalent in each of the exposures. These elements are then processed in Processing Procedure I. Curves are then plotted for the cyan density of the red light exposure and the cyan density of the neutral exposure. The difference in speed for the two curves is the increased log $E$ speed in the test elements indicates the improvement in cyan undercut interimage effects is measured by the increase in $\Delta$ log $E$ speed between the cyan of the red exposure as compared to the cyan of the neutral exposure in each element. The greater the $\Delta$ log $E$ difference, the greater the undercut interimage effect. The results are shown in Table I, below.

TABLE I

| Addenda | Concentration addenda per mole of silver, all emulsion layers | Cyan undercut $\Delta$ log $E$ at 0.6 density |
|---|---|---|
| Control | | +.26 |
| Compound 12 | 200 mg. | +.68 |

EXAMPLE 2

Several photographic elements of Type I are prepared. One of these elements serves as a control. The other elements are exactly the same as the control except that a 4-thiazoline-2-thione compound is added to the blue-sensitive layer, Layer G. Separate areas of each of these coatings are given a single color sensitometric exposure to red, green and blue light, respectively. Unexposed portions of each photographic element are then given an equivalent neutral sensitometric exposure consisting of red plus green plus blue light. The red, green and blue of the neutral exposure are the same as the single color red, green and blue exposures, respectively. All photographic elements are processed by Processing Procedure I. Density curves are plotted for each of the cyan, magenta and yellow dye densities formed from the red, green and blue light exposures, respectively, and for the respective cyan, magenta and yellow dye densities formed by the neutral exposure. The resulting single color density curves are compared for speed ($\Delta$ log $E$) to the same color density curves of the neutral exposure at 0.6 density. The improvement in undercut interimage effects is shown in Table II, and is indicated by the increased $\Delta$ log $E$ speed at 0.6 density of a given color scale compared with the corresponding color scale resulting from the neutral exposure.

TABLE II

| Addenda | Concentration addenda per mole of silver in blue sensitive layer, mg. | $\Delta$ log $E$ at 0.6 density | | |
|---|---|---|---|---|
| | | Cyan | Magenta | Yellow |
| Control | | +.30 | +.28 | +.10 |
| Compound 12 | 100 | +.50 | +.50 | +.20 |
| Control | | +.22 | +.06 | +.28 |
| Compound 7 | 400 | +.33 | +.18 | +.29 |
| Compound 8 | 200 | +.48 | +.41 | +.13 |
| Compound 9 | 200 | +.44 | +.40 | +.26 |

The increased log E speed in the test elements indicates the improvement of undercut interimage effects in the photographic elements containing a 4-thiazoline-2-thione.

EXAMPLE 3

Several photosensitive elements of Type I are prepared. One serves as the control. The other elements differ from the control only in that a 4-thiazoline-2-thione is incorporated in the top blue-sensitive layer, Layer G. Each coating is given the same sensitometric red exposure with and without an additional exposure to blue light to produce an image in the blue-sensitive, yellow-forming layer. The photographic elements are processed in Processing Procedure I and the resulting cyan density curves of the red light exposures are plotted and compared with the cyan density curves plotted for the red plus blue exposures. The improvement in cyan undercut interimage effect is shown by the increased difference in $\Delta$ log $E$ speed at 0.6 density between the cyan of the red exposure compared to the cyan of the red plus blue exposure. The greater the $\Delta$ log $E$ difference, the greater the interimage undercut effect. The results are shown in Table III.

TABLE III

| Addenda | Concentration addenda per mole of silver in blue sensitive layer, mg. | Δ log E at 06. density, cyan undercut |
|---|---|---|
| Control | 100 | +.05 |
| Compound 1 | 100 | +.23 |
| Do | 200 | +.29 |
| Compound 13 | 50 | +.20 |
| Do | 100 | +.18 |

In the above table, Compound 13 is 2,2-bis-[4-D-arabino-1,2,3,4-tetrahydroxybutyl)-4-thiazoline]-disulfide. It cleaves to the corresponding 4-thiazoline-2-thione form upon addition to the emulsion.

EXAMPLE 4

Several photosensitive elements of Type I are prepared, exposed and processed in the same manner as that described in Example 3. A control is tested and compared to elements of the same composition except that the test elements contain various 4 - thiazoline - 2 - thione compounds, at various concentrations in the respective elements, in the blue sensitive layer, Layer G. In this example, the effect of the addendum is determined by measuring the repression of the cyan development of a uniform red flash produced by the sensitometric blue light exposure. The measure of this interimage effect is expressed as the greatest change in density of the effected layer (referred to herein as $\Delta d$) and in the change of the average gradient ($\gamma$) of the effected layer when compared to a control. The higher the average gradient and the larger the $\Delta d$, the greater the undercut interimage effects produced by the addendum. The results are shown in Table IV.

TABLE IV

| Addenda | Concentration in mg. per mole of silver | Average gradient (γ) | Δd |
|---|---|---|---|
| Control | | .16 | +.18 |
| Compound 12 | 100 | .30 | +.31 |
| Do | 200 | .24 | +.27 |
| Compound 11 | 100 | .36 | +.31 |
| Do | 200 | .31 | +.30 |
| Compound 10 | 100 | .40 | +.36 |
| Do | 200 | .46 | +.46 |

The highly unobvious nature of this invention is apparent by the fact that a number of compounds closely related to the subject 4-thiazoline-2-thiones fail to produce undercut interimage effects. When Example 4 is repeated but the addendum employed is 3-carboxyethyl-4-methylthiazoline-2-thione, Compound A; 2,2'-dithia-[5,4-(1,2 - D-tritylgluco)-thiazol], Compound B; 2-amino-5-thiazole carboxylic acid, Compound C; and di-(2-amino-4-methylthiazole-5-yl)-sulfide, Compound D, no undercut interimage effects are obtained. The results of tests made with Compounds A, C, and D are shown in Table V.

TABLE V

| Addenda | Concentration in mg. per mole of silver | Average gradient (γ) | Δd |
|---|---|---|---|
| Control | | .16 | +.18 |
| Compound A | 100 | .10 | +.14 |
| Do | 200 | .10 | +.12 |
| Compound D | 100 | .16 | +.10 |
| Do | 200 | .16 | +.14 |
| Compound C | 100 | .16 | +.18 |
| Do | 200 | .12 | +.16 |

EXAMPLE 5

Several photosensitive elements of Type II are prepared. Another set of photosensitive elements of the same composition are prepared, except that 200 mg. per mole of silver of Compound 12 is added to each light sensitive silver halide layer. Each of the series of photosensitive elements are exposed as described in Example 2, and are processed according to Processing Procedure II. Undercut interimage effects are determined as described in Example 2. The results are shown in Table VII.

TABLE VII

| Addenda | Concentration per mole of silver, mg. | Δ log E at 0.6 density (undercut) | | |
|---|---|---|---|---|
| | | Cyan | Magenta | Yellow |
| Control | | +.05 | +.02 | -.21 |
| Compound 12 | 200 | +.16 | +.16 | +.15 |

Undercut interimage effects similar to those of Example 5 are obtained when Compound 8 is substituted for Compound 12, and when either of these compounds is dissolved in an aqueous solution and the photographic element is bathed in that solution prior to the first developer in Processing Procedure II, or when either of these compounds is added to the first developer in Processing Procedure II.

Desirable interimage effects are obtained when the invention is practiced using elevated processing temperatures, as illustrated in Example 6.

EXAMPLE 6

A photographic element of Type I is prepared as the control. A similar photographic element was prepared except that 200 mg. of Compound 12 per mole of silver is incorporated in the blue-sensitive layer, Layer G. The effect of the addendum is determined, as in Example 4, by measuring (1) the repression of the cyan development of a uniform red flash produced by a sensitometric blue and green light exposure, (2) the repression of the magenta development of a uniform green flash produced by a sensitometric red and blue exposure and (3) the repression of the yellow development of a uniform blue flash produced by a sensitometric red and green exposure. The measure of this interimage effect is expressed as the greatest change in density of the effected layer (referred to herein as $\Delta d$) and in the change of the average gradient ($\gamma$) of the effected layer when compared to a control. The higher the average gradient and the larger the $\Delta d$, the greater the undercut interimage effects produced by the addendum. After exposure, the coatings are bathed for 2 minutes in a prehardener bath, at 95° F., having the following composition:

| Compound— | Amount |
|---|---|
| Octyl alcohol _____ml__ | 0.10 |
| Sodium sulfate _____g__ | 158.0 |
| Sodium bromide _____g__ | 2.0 |
| Glacial acetic acid _____ml__ | 21.7 |
| Succinaldehyde (100%) _____g__ | 2.20 |
| (mix for 15 min.) | |
| NaOH _____g__ | 10.0 |
| (mix 5 min. or until NaOH is dissolved) | |
| Formalin (37.5%) _____ml__ | 27.0 |
| Water to 1.0 liter. | |
| pH 80° F. _____ | 4.80 | then bathed for 30 seconds in a 95° F. neutralizer bath having the following composition:

| Compound— | Amount |
|---|---|
| Hydroxylamine sulfate (26.3 g. M) _____g__ | 25.0 |
| Sodium bromide _____g__ | 2.0 |
| Glacial acetic acid _____ml__ | 10.0 |
| NaOH _____g__ | 6.0 |
| $Na_2SO_4$ _____g__ | 100.0 |
| Water to 1.0 liter. | |
| pH 80° F. _____ | 5.00 |

Processing Procedure I is then repeated exactly except each bath is maintained at 125° F. and residence times are reduced to a total of 4 minutes. The results are shown in Table VIII below:

| Addendum | Conc. mg./Ag mole | Cyan density | | Magenta density | | Yellow density | |
|---|---|---|---|---|---|---|---|
| | | γ | Δd | γ | Δd | γ | Δd |
| Control | | .09 | +.12 | .23 | +.48 | .11 | +.2 |
| Compound 12 | 200 | .15 | +.30 | .44 | +.78 | .17 | +.32 |

These results show good interimage effects for multilayer photographic elements processed at a high temperature in the presence of a 4-thiazoline-2-thione.

The invention has been described in detail with particular reference to preferred embodiments thereof, but, it will be understood that variations and modifications can be effected within the spirit and scope of the invention described hereinabove and in the appended claims.

I claim:

1. An unexposed photographic element suitable for providing multicolor records comprising a support having coated thereon at least two superposed hydrophilic colloid layers containing light-sensitive silver halide, at least one hydrophilic colloid layer of said element containing a diffusible 4-thiazoline-2-thione, which photographic element exhibits undercut interimage effects when photographic silver images are developed in said light sensitive layers and dye images are formed in proportion to said silver images.

2. A photographic element as defined in claim 1 wherein said 4-thiazoline-2-thione has, in the 4-position thereof, an alkyl substituent having a group selected from the class consisting of carbonyl and hydroxyl.

3. A photographic element as defined in claim 1 wherein said 4-thiazoline-2-thione contains an alkyl substituent in the 4-position, said alkyl substituent consisting of from 4 to 5 carbon atoms, each of said carbon atoms having a hydroxyl group attached thereto.

4. A photographic element as defined in claim 1 wherein said 4-thiazoline-2-thione contains, in the 4-position thereof, a substituent selected from the group consisting of formyl, carboxyl, ethoxycarbonyl, hydroxymethyl, and acetoxymethyl.

5. A photographic element as defined in claim 1 wherein said 4-thiazoline-2-thione has the following general formula:

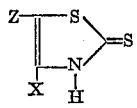

wherein X represents a substituent selected of the class consisting of alkyl; an alkyl substituent containing at least one hydroxyl group; and, an alkyl substituent having at least one carbonyl-containing group; and Z represents a substituent selected from the class consisting of hydrogen; alkyl; an alkyl substituent containing at least one hydroxyl group; and, an alkyl substituent containing at least one carbonyl-containing group.

6. An unexposed photographic element suitable for providing multicolor records which comprises a support having coated thereon at least three superposed hydrophilic colloid layers containing light sensitive silver halide, said layers being sensitive to red, green and blue radiation, at least one hydrophilic colloid layer of said element having incorporated therein a 4-thiazoline-2-thione, which photographic element exhibits undercut interimagee effects when photographic silver images are developed in said light sensitive layers and dye images are formed in proportion to said silver images.

7. An unexposed photographic element suitable for providing multicolor records which comprises a support having coated thereon at least three superposed hydrophilic colloid layers containing light sensitive silver halide, the silver halide of at least one of said layers comprising silver bromoiodide, said layers being sensitive to red, green and blue radiation, at least one hydrophilic colloid layer of said element having incorporated therein a 4-thiazoline-2-thione, which photographic element exhibits undercut interimage effects when photographic silver images are developed in said light sensitive layers and dye images are formed in proportion to said silver images.

8. A photographic element as defined in claim 7 wherein said 4-thiazoline-2-thione has, in the 4-position thereof, an alkyl substituent having a group selected from the class consisting of carbonyl and hydroxyl.

9. A photographic element as defined in claim 7 wherein said 4-thiazoline-2-thione contains an alkyl substituent in the 4-position, said alkyl substituent consisting of from 4 to 5 carbon atoms, each of said carbon atoms having a hydroxyl group attached thereto.

10. A photographic element as defined in claim 7 wherein said 4-thiazoline-2-thione contains, in the 4-position thereof, a substituent selected from the group consisting of formyl, carboxyl, ethoxycarbonyl, hydroxymethyl and acetoxymethyl.

11. A photographic element as defined in claim 7 wherein said 4-thiazoline-2-thione has the following general formula:

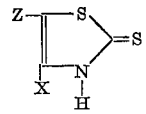

wherein X represents a substituent selected of the class consisting of alkyl; an alkyl substituent containing at least one hydroxyl group; and an alkyl substituent having at least one carbonyl-containing group; and Z represents a substituent selected from the class consisting of hydrogen; alkyl; an alkyl substituent containing at least one hydroxyl group; and, an alkyl substituent containing at least one carbonyl-containing group.

12. An unexposed photographic element suitable for providing multicolor records which comprises a support having coated thereon at least three superposed hydrophilic colloid layers containing light sensitive silver halide, the silver halide of at least one of said layers comprising silver bromoiodide, said layers being sensitive to red, green and blue radiation, at least one hydrophilic colloid layer of said element having incorporated therein a compound selected from the group consisting of 4-thiazoline-4-carboxaldehyde-2-thione; 5 - carbethoxy-4-methyl-4-thiazoline-2-thione; 4-carboxy-4-thiazoline-2-thione; 4-carboxy-5-methyl-4-thiazoline-2-thione; 4 - carbethoxy-4-thiazoline-2-thione; 4-acetoxymethyl-4-thiazoline-2-thione; 4-(D-arabino - tetraacetoxybutyl)-4-thiazoline-2-thione; 4-(D-gluco-penta - acetoxypentyl)-4-thiazoline-2-thione; 4-(D-gluco-penta - hydroxypentyl)-4-thiazoline-2-thione; 4-hydroxymethyl-4-thiazoline-2-thione; 4 - methyl-4-thiazoline-2-thione; and 4-(D - arabino-1,2,3,4-tetrahydroxybutyl)-4-thiazoline-2-thione.

13. An unexposed photographic element suitable for providing multicolor records which comprises a support having coated thereon at least three superposed hydrophilic colloid layers containing light sensitive silver bromoiodide, said layers being sensitive to red, green and blue radiation, each of said layers having incorporated therein a photographic color former which reacts with the oxidation products of primary aromatic amino color developing agent to form, respectively, cyan magenta and yellow dye in said layers; at least one hydrophilic colloid layer of said element having incorporated therein a 4-thiazoline-2-thione, which photographic element exhibits undercut interimage effects when photographic silver images are developed in said light sensitive layers and dye images are formed in proportion to said silver images.

14. A photographic element as defined in claim 13 wherein said 4-thiazoline-2-thione has, in the 4-position thereof, an alkyl substituent having a group selected from the class consisting of carbonyl and hydroxyl.

15. A photographic element as defined in claim 13 wherein said 4-thiazoline-2-thione contains an alkyl substituent in the 4-position, said alkyl substituent consisting of from 4 to 5 carbon atoms, each of said carbon atoms having a hydroxyl group attached thereto.

16. A photographic element as defined in claim 13 wherein said 4-thiazoline-2-thione contains, in the 4-position thereof, a substituent selected from the group consisting of formyl, carboxyl, ethoxycarbonyl, hydroxymethyl, and acetoxymethyl.

17. A photographic element as defined in claim 13 wherein said 4-thiazoline-2-thione which has the following general formula:

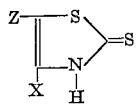

wherein X represents a substituent selected of the class consisting of alkyl; an alkyl substituent containing at least one hydroxyl group; and an alkyl substituent having at least one carbonyl-containing group; and Z represents a substituent selected from the class consisting of hydrogen; alkyl; an alkyl substituent containing at least one hydroxyl group; and, an alkyl substituent containing at least one carbonyl-containing group.

18. An unexposed photographic element suitable for providing multicolor records which comprises a support having coated thereon at least three superposed hydrophilic colloid layers containing light sensitive silver bromoiodide, said layers being sensitive to red, green and blue radiation, each of said layers having incorporated therein a photographic color former which reacts with the oxidation products of primray aromatic amino color developing agent to form, respectively, cyan, magenta and yellow dye in said layers; at least said colloid layer containing blue sensitive silver halide having incorporated therein a compound selected from the group consisting of 4-thiazoline - 2 - carboxaldehyde - 2-thione; 5-carbethoxy-4-methyl - 4 - thiazoline - 2-thione; 4-carboxy-4-thiazoline-2 - thione; 4 - carboxy - 5 - methyl-4-thiazoline-2-thione; 4 carbethoxy-4-thiazoline-2-thione; 4 - acetoxymethyl-4-thiazoline-2-thione; 4-(D-arabino-tetraacetoxybutyl)-4-thiazoline - 2 - thione; 4 - (D-gluco-penta-acetoxypentyl)-4-thiazoline - 2 - thione; 4 - (D-gluco-penta-hydroxypentyl)-4 - thiazoline - 2 - thione; 4-hydroxymethyl-4-thiazoline-2-thione; 4 - methyl - 4 - thiazoline - 2 - thione; and 4 - (D-arabino - 1,2,3,4 - tetrahydroxybutyl) - 4 - thiazoline-2-thione.

19. An unexposed photographic element suitable for providing multicolor records which comprises a support having coated thereon at least three superposed hydrophilic colloid layers containing light sensitive silver bromoiodide, said layers being sensitive to red, green and blue radiation, each of said layers having incorporated therein a photographic color former which reacts with the oxidation products of primary aromatic amino color developing agent to form, respectively, cyan, magenta and yellow dye in said layers; at least said colloid layer containing blue sensitive silver halide having incorporated therein 4 - (D - arabino - 1,2,3,4-tetrahydroxybutyl)-4-thiazoline-2-thione.

20. The photographic process which comprises developing silver images in an exposed photographic element comprising a support having coated thereon at least two superposed hydrophilic colloid layers containing light-sensitive silver halide, at least one hydrophilic colloid layer of said element containing, at the time of exposure, diffusible 4 - thiazoline - 2 - thione; and, forming dye images in proportion to said silver images to obtain undercut interimage effects in said dye images.

21. The photographic process which comprises developing a negative silver image in a photographic element that has been given a first exposure, which photographic element comprises a support having coated thereon at least three superposed hydrophilic colloid layers containing light sensitive silver bromoiodide, said layers being sensitive to red, green, and blue radiation, each of said layers having incorporated therein a photographic color former which reacts with the oxidation products of primary aromatic amino color developing agent to form, respectively, cyan, magenta and yellow dye in said layers, at least one hydrophilic colloid layer of said element having incorporated therein, at the time of exposure, a 4-thiazoline-2-thione which has the following general formula:

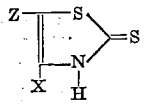

wherein X represents a substituent selected of the class consisting of alkyl; an alkyl substituent containing at least one hydroxyl group; and an alkyl substituent having at least one carbonyl-containing group; and Z represents a substituent selected from the class consisting of hydrogen; alkyl; and alkyl substituent containing at least one hydroxyl group; and, an alkyl substituent containing at least one carbonyl-containing group; exposing said element a second time; and, developing said element with primary aromatic color developing agent to form cyan, magenta and yellow dye images which exhibit inter-image effects.

22. The photographic process which comprises developing a negative silver image in a photographic element that has been given a first exposure, which photographic element comprises a support having coated thereon at least three superposed hydrophilic colloid layers containing light sensitive silver bromoiodide, said layers being sensitive to red, green, and blue radiation, each of said layers having incorporated therein a photographic color former which reacts with the oxidation products of primary aromatic amino color developing agent to form, respectively, cyan, magenta and yellow dye in said layers, at least one hydrophilic colloid layer of said element having incorporated therein, at the time of exposure, 4-(D-arabino-1,2,3,4 - tetrahydroxybutyl) - 4 - thiazoline-2-thione; exposing said element as second time; and, developing said element with primary aromatic color developing agent to form cyan, magenta and yellow dye images which exhibit inter-image effects.

References Cited

UNITED STATES PATENTS 3,404,002   10/1968   Becker _____ 96—29

NORMAN G. TORCHIN, Primary Examiner

A. T. SURO PICO, Assistant Examiner

U.S. Cl. X.R.

96—59